(12) United States Patent
Ganter

(10) Patent No.: US 9,391,720 B2
(45) Date of Patent: Jul. 12, 2016

(54) APPARATUS AND METHOD FOR RECEIVER WITH INTERFERENCE TOLERANCE

(71) Applicant: Custom Link Corporation, Boulder, CO (US)

(72) Inventor: William A. Ganter, Boulder, CO (US)

(73) Assignee: Custom Link Corporation, Boulder, CO (US)

( * ) Notice: Subject to any disclaimer, the term of this patent is extended or adjusted under 35 U.S.C. 154(b) by 65 days.

(21) Appl. No.: 14/533,677

(22) Filed: Nov. 5, 2014

(65) Prior Publication Data

US 2016/0127053 A1    May 5, 2016

(51) Int. Cl.
| | |
|---|---|
| H04B 17/00 | (2015.01) |
| H04B 1/10 | (2006.01) |
| H04B 17/20 | (2015.01) |
| H04B 1/16 | (2006.01) |
| H04B 15/00 | (2006.01) |
| H04B 1/00 | (2006.01) |
| H04B 1/12 | (2006.01) |

(52) U.S. Cl.
CPC .............. *H04B 17/20* (2015.01); *H04B 1/0003* (2013.01); *H04B 1/123* (2013.01); *H04B 1/16* (2013.01); *H04B 15/00* (2013.01)

(58) Field of Classification Search
CPC ........ H04B 1/40; H04B 10/60; H04L 1/0054; H04L 7/0334; H04L 27/06
USPC ........... 455/131, 226.1, 226.3, 255, 265, 313, 455/323, 334, 296.313; 375/229, 232, 316, 375/324, 340
See application file for complete search history.

(56) References Cited

U.S. PATENT DOCUMENTS

| | | | | |
|---|---|---|---|---|
| 5,838,727 | A * | 11/1998 | Lyon | H04L 27/2071 375/340 |
| 6,400,414 | B1 * | 6/2002 | Tsukida | H04N 19/23 348/581 |
| 6,671,334 | B1 * | 12/2003 | Kuntz | H04L 7/0029 375/340 |
| 7,130,360 | B2 * | 10/2006 | Lee | H04L 7/007 375/316 |
| 7,321,619 | B2 * | 1/2008 | Samueli | H04L 7/0054 375/229 |
| 7,321,641 | B2 * | 1/2008 | Moulthrop | H04L 27/3863 375/332 |
| 7,826,570 | B2 * | 11/2010 | Tokoro | H04B 7/0848 375/316 |
| 8,320,503 | B2 * | 11/2012 | Tamura | H04L 7/0331 375/316 |
| 8,786,938 | B2 * | 7/2014 | Li | H04L 27/223 359/325 |
| 9,137,070 | B2 * | 9/2015 | Beukema | H04L 27/0014 |

* cited by examiner

*Primary Examiner* — Quochien B Vuong
(74) *Attorney, Agent, or Firm* — Dietze and Davis, P.C.; Glenn H. Lenzen

(57) ABSTRACT

A receiver apparatus adapted to be synchronized with a link transmitter to identify and isolate a transmitted, modulated carrier signal from other RF transmissions by obtaining A/D samples at each integer $\pi$ zero crossing of a transmitted signal and at the half Hertz cycles ($\pi/2$ and $3\pi/2$) of the modulated carrier signal. The integer $\pi$ A/D samples are at the carrier signal zero crossings and thus contain only the other RF and noise in the receiving antenna. The half Hertz cycle A/D samples contain both the carrier signal and the other RF being received at that instant. The analytical methods of the invention use the integer $\pi$ A/D samples to compute estimates of the other RF in the half integer $\pi$ A/D samples in order to separate it for the detection of the transmitted signal, thereby benefiting narrow band signals with constant zero crossing that are directly coded on the carrier frequency as DC balanced symbols, and enabling higher data rates than are typically achievable by passband filtering the receiving antenna waveform.

17 Claims, 6 Drawing Sheets

APPARATUS AND METHOD FOR RECEIVER WITH INTERFERENCE TOLERANCE

FIELD OF THE INVENTION

This invention relates to wireless data transmission. More specifically, this invention relates to a novel adaptive software receiver for enhanced wireless data transmissions designed to tolerate interference from other wireless transmitters arising from the increasing congestion in wireless data transmission spectra.

BACKGROUND

The present invention provides an apparatus and methodologies to continuously monitor, via analog to digital (A/D) sampling with an analog to digital converter, a specific transmitted signal selected for data transmission and all other radio frequency (RF) transmissions and random noise in a wireless receiver, and then utilizing this information to detect the transmitted signal, but only when this signal is of the class of direct carrier modulation specifically designed for the apparatus and methodology of this invention. Signal designs that can be used advantageously by the methods of the present invention must have both constant zero crossings of the modulated carrier frequency and be DC balanced symbols. Exemplary signal designs with these two critical properties are presented in U.S. Pat. No. 8,750,420 B2 the same inventor of the present invention, and some additional exemplary signal designs that comply with these criteria are presented in US Patent Application Publication US 2013/0034183 A1, also by this same inventor.

The receiver of the present invention A/D samples RF transmissions in the antenna, which includes the transmitted signal along with all other RF in the transmissions received by the antenna, at the zero crossings of the transmitted signal. Other RF in a receiving antenna is unwanted but inevitable. It is generally referred to as noise and interference to a transmitted signal and its relative power is commonly expressed as a signal to noise ratio. While such terminology is not strictly precise, its broad meaning is well understood. Accordingly, for purposes of this disclosure, the term "other RF" hereinafter refers to any RF energy generated by all transmitters and unintentional emitters, including random noise, that are superimposed in a receiver antenna along with the transmitted signal. Interference complicates signal detection. The novel apparatus and methods disclosed herein tolerate this interference and computationally process it to detect the signal.

Processing differs from filtering a carrier mixed with baseband content. Over a number of Hertz cycles of the transmitted carrier, filters phase cancel frequencies that are outside of the desired passband. However, filtering is not perfect in highly congested spectrum, inasmuch as some emitted radiation of differing frequencies from any source can randomly combine momentarily to appear in the passband along with the signal, thus randomly modulating the filter output waveform. However, this modulation is averaged during the demodulation of the baseband, thereby lessening its interfering effects. However, as a major advantage over the prior art, the system and processing methods of the present invention detect transmitted bits in far fewer carrier Hertz cycles than is possible with filtering. From a filtering perspective, a practical definition of interference is the RF from other transmissions and emissions that a filter is unable to remove.

SUMMARY

The signal designs of the present invention are very narrow band. These designs, when transmitted in a communications channel or link, are very steady and symmetric making them easily filtered away by other receivers operating in nearby carrier frequencies. The high data rates of the present invention are made possible by continuously processing the other RF in the antenna to gain information about the transmitted signal carrying information and/or data, also referred to herein as a bit stream. Data rates are measured as bits per second (bps) and spectral efficiency is expressed as bps/Hz.

In accordance with the present invention, the receiver antenna analog waveform is amplified and then A/D sampled at the time instant of each integer $\pi$ of the signal after synchronization. These integer $\pi$ A/D samples are taken at the zero crossings of the signal and contain only the amplitude of the other RF at each sample time, a novel feature of the present invention. The sampling provides the information for adapting to the other RF in the receiving antenna, and it provides the information used to effectively remove the other RF in the half integer $\pi$ A/D samples that contain both the signal and the other RF, thus enabling very effective detection of the signal that was transmitted in the link.

The link transmitting the signal can be quickly adapted to measured changes in the other RF. This ability to rapidly adapt is a novel software feature of the receiver of the present invention. The other RF is continually monitored with the integer $\pi$ A/D samples. The receiver reverse signals the link transmitter regarding the other RF presently in the receiving antenna. Processing the other RF out instead of filtering the other RF out provides the means for tolerating interference. This tolerance is further enhanced by adapting to other RF present in the receiving antenna at any time.

DETAILED DESCRIPTION

It should be noted that the present description is by way of illustration only, and that the concepts and examples presented herein are not limited to use or application with any single adaptive receiver apparatus or method adapted to tolerate interference from other transmitters. Hence, while the details of the receiver apparatus and methodologies herein are for the convenience of illustration and explanation with respect to the exemplary embodiments, the principles disclosed may be applied to other types of adaptive receivers for wireless data transmission without departing from the scope of the present invention. For purposes of describing the structure and operation of the various aspects of the instant invention and as will be explained in greater detail below, it should be noted that the other RF from transmitters on different carrier frequencies will combine in a generally smooth waveform that continuously varies in both amplitude and phase relative to the signal. Discontinuities in the waveform of the other RF result when those transmitters come on and turn off, and from random noise spikes.

Figure 1:
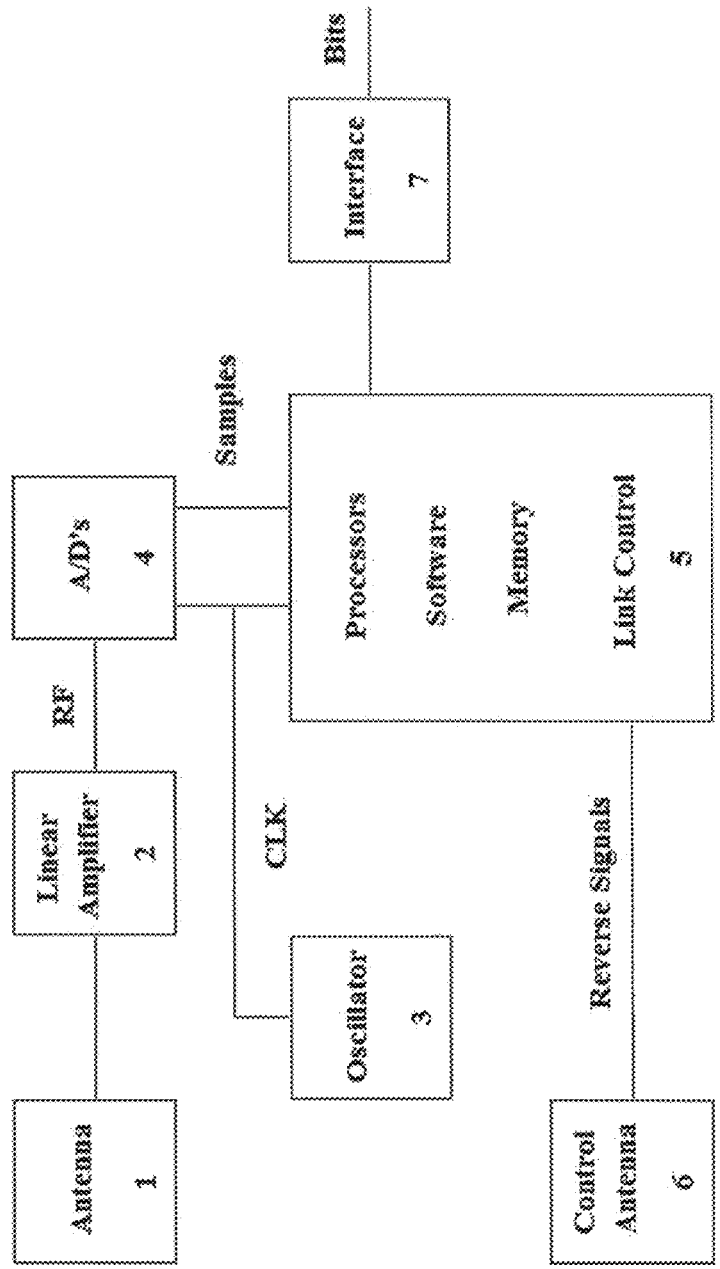
FIG. 1 is a block diagram of a receiver apparatus including a reverse signaling block to the signal transmitter of the link in accordance with an embodiment of the present invention.

Receiver Apparatus:

A receiver 10 and its components according to an embodiment of the present invention is shown as a block diagram in FIG. 1. The receiver 10 contains an antenna 1 operationally connected to a linear amplifier 2, the antenna being structured and arranged to receive other RF and a transmitted directly modulated carrier signal having a carrier frequency f and carrying information and/or data, also known in the art as bit stream. For ease of description, hereinafter, a transmitted modulated carrier signal will be referred to simply as a carrier signal or carrier. An oscillator module 3 cycles at frequency 4f producing a clock (CLK) pulse at each half Hertz cycle time interval of carrier frequency f arriving from a link transmitter (not shown). The CLK sets the sample time for at least four analog to digital converters (hereinafter "A/D's") shown generally at 4 to sample the incoming carrier signal and other RF at $\pi/2$ intervals, where $\pi$ is a mathematical constant as is known' in the art. Using this approach, the A/D converters sample the other RF at each integer $\pi$ and to sample the carrier signal and the other RF at each half integer $\pi$ of the carrier frequency. This CLK pulse is also needed to set an instruction time for a processing module 5 which contains a plurality of processors 51, computational method software 53, a memory 55 and link control software 57. A special purpose transmitter and antenna which generate a separate reverse signaling channel used for link control are illustrated generally at 6. The separate reverse signaling channel is needed in order to provide the transmitter with information related to synchronization, the monitored status of the other RF, and the detection status in the receiver 10. The software detected bit stream interfaces to a data user in interface component 7.

The A/D's 4 sample at each half $\pi$ in a Hertz cell, specifically $$\frac{\pi}{2} \text{ and } 3\frac{\pi}{2},$$

the maximum plus and minus amplitudes of a carrier signal sine wave. These samples contain the carrier signal amplitude and the amplitude of the other RF in arbitrary phase to one another. The methods of the present invention use the integer $\pi$ A/D samples, specifically at $0\pi$, $1\pi$, $2\pi$, etc., where these samples are at the carrier signal zero crossings and thus contain only the amplitude of the other RF. These A/D samples of the other RF are inputs to the computational methods software 53 of the present invention to estimate the amplitude of the other RF contained in the half $\pi$ A/D samples so that it can be approximately removed for the purpose of detecting the transmitted carrier signal level.

Adaptive Link Control Software:

As will now be described in greater detail, the receiver 10 contains link control software 57 in memory 55 for several very important purposes. Link control is accomplished by a special transmitter that reverse signals the receiver event status back to the link transmitter via the special control antenna, both of which are contained at 6 in the block diagram of FIG. 1.

Various link control codes can interact to establish synchronization and to confirm synchronization, and are required to confirm successful detection of a data block, to pause when additional software computational method steps exceed the preset data block processing time, to signal to resume by transmitting the next data block following a pause, and to request a data block retransmit when some ambiguity could not be resolved within the computational methods of the invention. These link controls in concert provide a means for error prevention. In the present invention the detection software methods either attain an assurance of correct detection or sense that some detection ambiguity remains. Additional computations in processors 51 during a reverse signaled pause are used to resolve ambiguity and when failing to do so, the receiver 10 reverts to redundancy, as the other RF will be different in the requested retransmission.

Synchronization:

In a preferred embodiment of the instant invention, a method of synchronization includes the steps of: sending a pure sine wave at carrier frequency f for some number of Hertz cycles from the link transmitter, pausing for a predetermined interval, for example, one nanosecond or some hundreds of picoseconds, and then transmitting again for the same number of Hertz cycles, pausing again, and repeating the transmit/pause cycle repetition. The A/D's 4 of the receiver 10 would continue sampling at integer and half integer $\pi$ intervals throughout the transmissions and pauses, thus shifting phase of the sine wave relative to the link transmitter in steps. When two of these A/D's either $0\pi$ and $1\pi$ or $$\frac{\pi}{2} \text{ and } 3\frac{\pi}{2}$$

simultaneously measure the anticipated plus and minus full signal amplitude, the special purpose transmitter 6 in the receiver reverse signals back to the link transmitter that synchronization has been achieved. The receiver link control software assigns the appropriate A/D to be the $0\pi$ sampler; here the transmission link is synchronized to the receiver.

Once synchronized, the link transmitter would send a header block and then start transmitting the data block. An exemplary final half Hertz cell of the header block is depicted in each of the FIGS. 2-6. It should be appreciated that alternative methods for link synchronization, that also utilize the same A/D samples 4, could be devised as variation embodiments that are within the spirit and scope of the present invention. One such variation would send the carrier signal for a larger number of Hertz cycles for averaging away the other RF, while another variation for synchronization could compute a single frequency resonator filter.

Detection Methods Overview:

The detection methods being disclosed herein are threefold. The simplest and most direct method of these three may be used when the other RF is found to have a zero crossing near A $$\frac{\pi}{2} \text{ or } 3\frac{\pi}{2} \text{ A/D}$$

sample time. In this scenario, A/D samples are mostly just the carrier signal amplitude that can be used directly for the signal amplitude detection. A second approach according to an embodiment of the methods of the present invention computes combinations of linear and quadratic curve fits on the other RF to interpolate or extrapolate an estimate of the other RF amplitude in a $$\frac{\pi}{2} \text{ or } 3\frac{\pi}{2} \text{ A/D}$$

sample, again for removal of the other RF to facilitate the i carrier signal amplitude detection computed in detection software 53. In a third embodiment, a method of the invention tests for DC balance in a known DC balanced symbol, as detected by one of the first two methods, and then adjusts for the most likely symbol in cases of ambiguity. In a half Hertz cell where the amplitude of the other RF is very low, the three above methods of the invention are not strictly needed, as in this instance, direct detection of an A/D amplitude near a signal level is both best and fastest.

Figure 4:
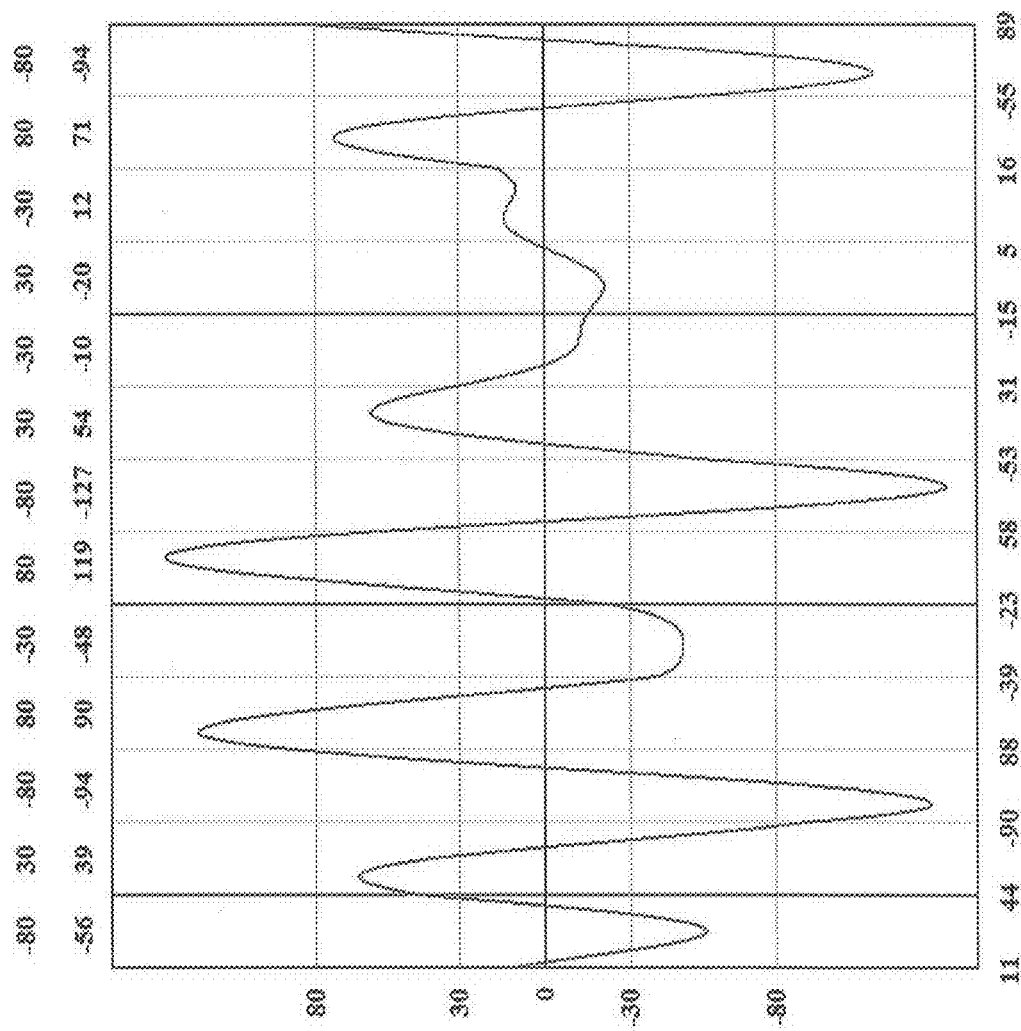
FIG. 4 graphically displays an exemplary 2 level in 2 Hertz signal design illustrating the tracking of the amplitude of the other RF in accordance with an embodiment.
Figure 5:
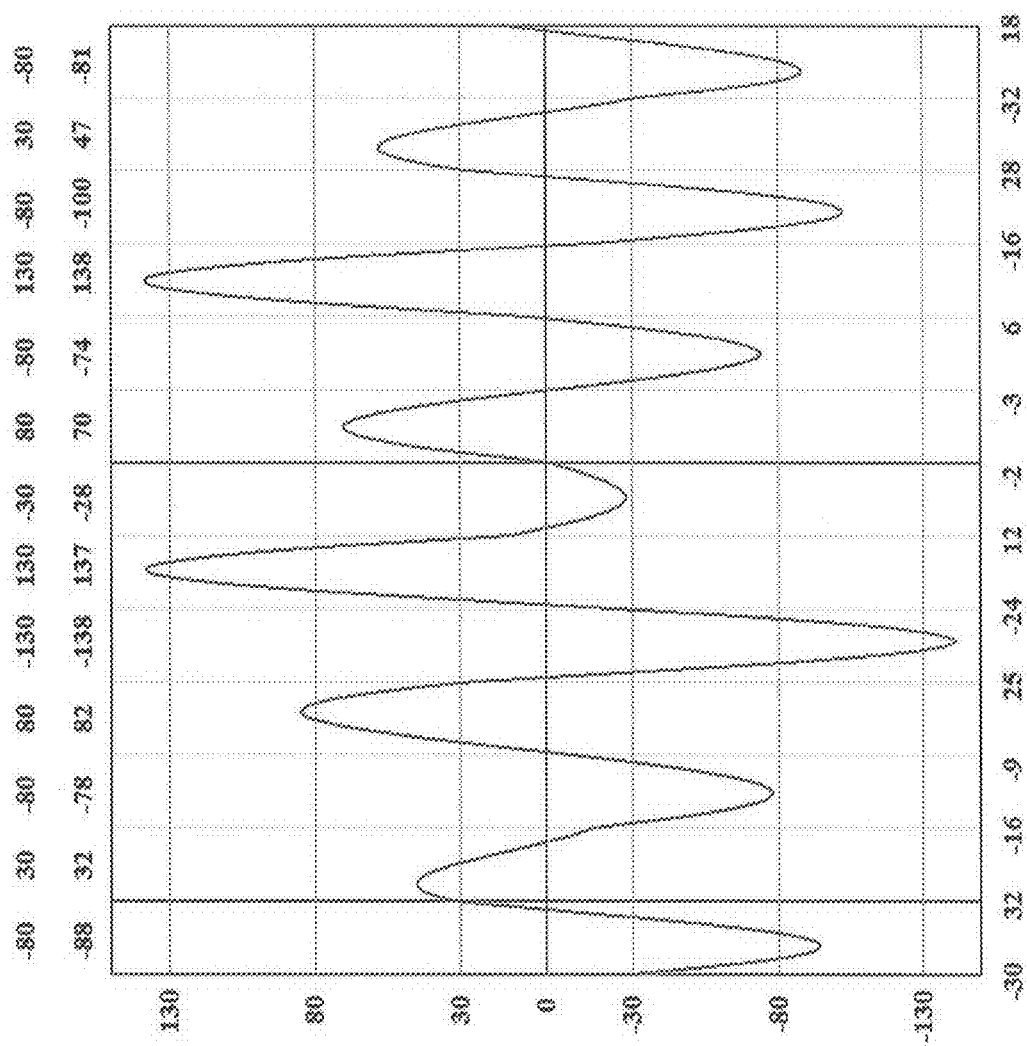
FIG. 5 graphically displays an exemplary 3 level in 3 Hertz signal design illustrating the tracking of the amplitude of the other RF in accordance with an embodiment.
Figure 6:
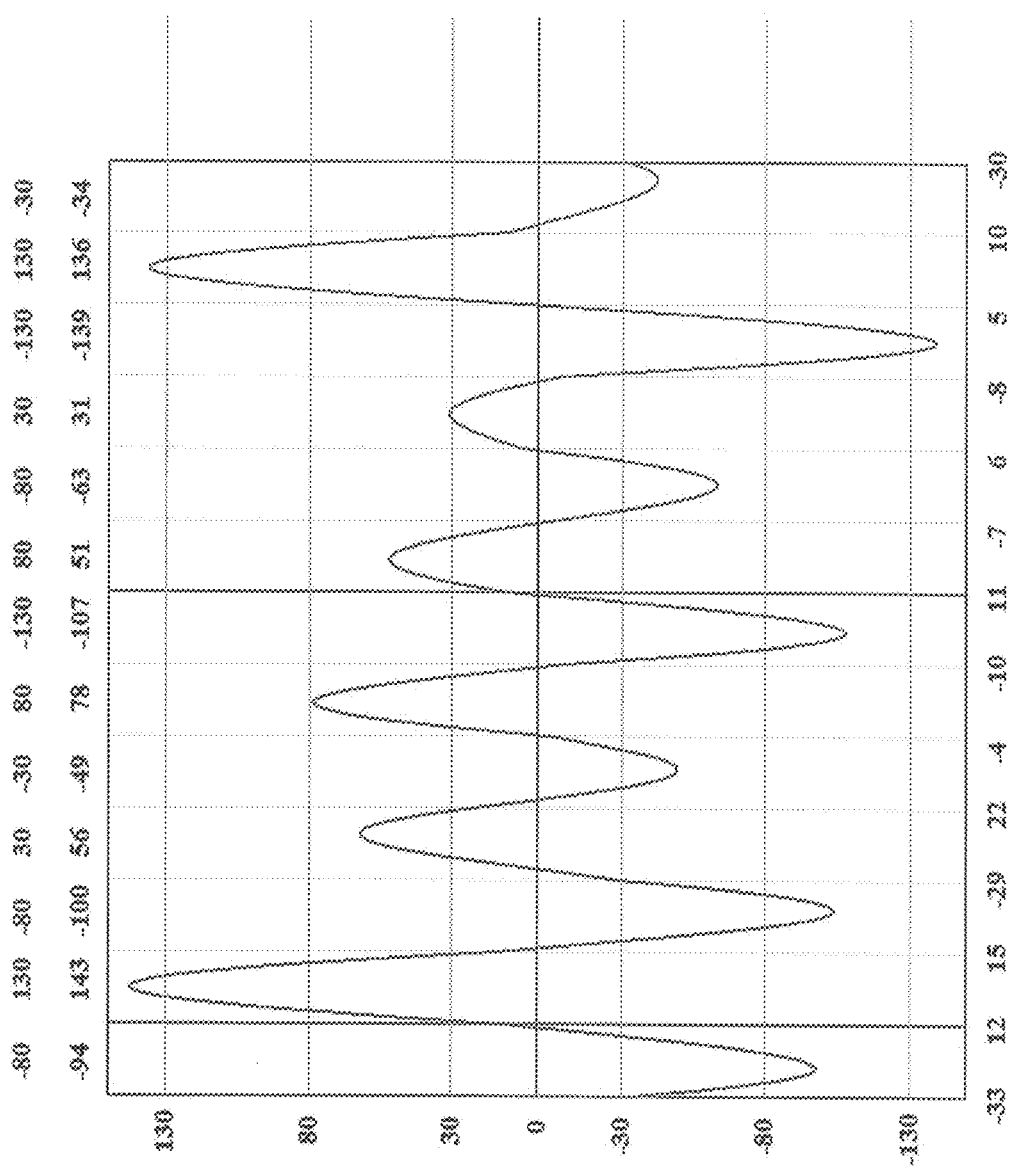
FIG. 6 graphically displays an exemplary 3 level in 3 Hertz signal design where a known designed signal amplitude is transmitted in one half Hertz cell to aid in tracking the amplitude of the other RF.

The rules for implementing these three methods vary somewhat depending on the carrier signal design that is being transmitted for detection in the receiver of the present invention. The signal designs presented herein are of three forms. The simplest form is where the carrier is transmitted as a pure sine wave for n complete Hertz cycles to code a 1 or a 0 bit, and is idle for n complete Hertz cycles to code the opposite bit. This design is depicted by the exemplary wave form illustrated in FIG. 2. In a second carrier signal design form, the carrier is transmitted again as a pure sine wave, in phase for n complete Hertz cycles to code a 1 or a 0 bit, and transmits 180 degrees out of phase for n complete Hertz cycles to code the opposite bit. This signal design is depicted by example in FIG. 3. The third carrier signal design form transmits an approximately shaped sine wave in phase for n greater than one complete Hertz cycles but has amplitude at one of two or more design levels in each half Hertz cycle such that the sum of the plus and minus levels across the n Hertz cycles is zero. This zero sum defines a DC balanced symbol. The number of valid DC balanced symbols being used in these designs is a power of 2. For instance 8 unique DC balanced symbols in two Hertz cycles code three bits for a 1.5f bps data rate. Examples of this third form of signal designs are depicted in FIG. 4, FIG. 5 and FIG. 6.

Examples of each of the three applicable carrier signal design forms are presented below along with their corresponding rules for efficiently implementing the three methods of the present invention. All use the integer π zero crossing A/D samples of the signal that reveal the other RF at that time instant. It should be appreciated that many different carrier signal designs of the three forms could be constructed that are within the scope of the present invention. As additional embodiment examples, any integer n Hertz cycles for a symbol and any different designed amplitude levels may be used in the analysis.

As illustrated in greater detail below, if one or more half Hertz cycles are transmitted at a common known signal level, the other RF in that cell would be revealed exactly. Reliable and sure identification of other RF amplitude is advantageous in starting the methods of the invention with certainty, but reduces the link data rate proportionally. This option can be a useful tradeoff in transmission channels when more other RF is present, or when adapting a link signaling in response to monitored changing conditions of the other RF. This exemplary signal design option is depicted in FIG. 6.

The following examples, as depicted in FIGS. 2 through 6, have different simulated random other RF. In real deployments of the invention, the other RF will always be different, everywhere and at all times. The other RF herein are simply examples from an infinite number of possible selections in order to show details of how the three methods of the present invention discussed above track the amplitude, phase and sign of the other RF.

The amplitudes of the integer π A/D samples are displayed below the waveform graphics, and the half Hertz cell A/D samples are displayed immediately above the waveform graphics in all five graphic illustrations (FIGS. 2-6). The amplitudes in the graphic illustrations are shown dimensionless in the range of approximately plus and minus 150 pixels. In real link deployments, these amplitudes would typically be in mili-volts (mV) set by linear amplifier 2. For purposes of clarity, the method computations used for detections in the five examples are presented within the descriptive text rather than being displayed in the accompanying graphical illustrations.

Computational Details of the Methods:

As shown below, equations were derived and are presented herein in accordance with an embodiment for making estimates about the amplitudes of the other RF in the receiving antenna. The zero crossing equations (3) and (4) have a linear form that is solved by setting it equal to zero. The equations for both linear interpolation (5) and (6) and linear extrapolation (7), (8), (9) and (10) are very standard and ordinary. However, the formulas for quadratic interpolation (11), (12), (13) and (14) are a more complex derivation fitting through three points to interpolate for an interior fourth point.

The following notation is used consistently in each of the equations and examples of the computation methods of the present invention. The integer π A/D samples containing the amplitude of the other RF are denoted by $r_0$, $r_1$ and $r_2$. The estimates of the other RF in the $$\frac{\pi}{2} \text{ and } 3\frac{\pi}{2} \text{ A/D}$$

samples are denoted by $r_{.5}$ and $r_{1.5}$ respectively. The A/D sample amplitude at the $$\frac{\pi}{2} \text{ and } 3\frac{\pi}{2}$$

half Hertz times is denoted by $a_{.5}$ and $a_{1.5}$ respectively. These A/D samples contain both the carrier signal amplitude denoted by $s_{.5}$ and $s_{1.5}$ and the other RF denoted by $r_{.5}$ and $r_{1.5}$. There is no need to define $a_0$, $a_1$ or $a_2$ as $r_0$ would be equal to $a_0$, etc. These summations are shown in equations (1) and (2).

$$a_{.5} = s_{.5} + r_{.5} \tag{1}$$

$$a_{1.5} = s_{1.5} + r_{1.5} \tag{2}$$

The method of estimating the location of another RF zero crossing between 0π and 1π denoted by $z_{01}$ is given in equation (3).

$$z_{01} = r_0/(r_0 - r_1) \tag{3}$$

Here $r_0$ and $r_1$ have opposite signs. Equation (3) gives a location value between 0 and 1π. Recall that A/D amplitude $a_{.5}$ is located in the center of the half Hertz cell at 0.5π. An equation (3) example is if $r_0 = 22$ and $r_1 = -18$, then the estimate for the location of the other RF zero crossing is at 22/40=0.55π. Equation (4) gives a zero crossing estimate between 1π, π and 2π denoted as $z_{12}$.

$$z_{12} = 1 + r_1/(r_1 - r_2) \tag{4}$$

An equation (4) example is if $r_1=-18$ and $r_2=5$, then the zero crossing location estimate is $z_{12}=1+(-18/-23)=1.783\pi$, beyond $1.5\pi$. The sine at $1.783\pi$ is $-0.630$. Accordingly, if the signal amplitude $s_{1.5}$ was $-80$ at $$3\frac{\pi}{2}$$

the signal amplitude would be approximately $-50.4$ at this other RF zero crossing.

The method of linear curve fit interpolation to estimate the other RF amplitude in a $$\frac{\pi}{2} A/D$$

sample is given in equation (5).

$$r_{.5}=(r_0+r_1)/2 \tag{5}$$

Equation (6) estimates the other RF in a $$3\frac{\pi}{2} A/D$$

$$r_{1.5}=(r_1+r_2)/2 \tag{6}$$

This linear interpolation estimate is most useful when the signs of $r_0$ and $r_1$, or $r_1$ and $r_2$ are opposite. When these are not only of opposite sign but add to near zero, then the other RF will have a zero crossing location near the center of the half Hertz cell.

When we have obtained an estimate of $r_{.5}$, a method of linear curve fit extrapolation given in equation (7) can estimate $r_{1.5}$.

$$r_{1.5}=2*r_1-r_{.5} \tag{7}$$

When we have obtained an estimate of $r_{1.5}$, then equation (8) provides an estimate of $r_{.5}$ by linear extrapolation.

$$r_{.5}=2*r_1-r_{1.5} \tag{8}$$

In the reverse direction a second estimate of $r_{.5}$ is given by equation (9).

$$r_{.5}=2*r_0-r_{1.5} \tag{9}$$

In equation (9) the $r_{1.5}$ estimate is from the previous half Hertz cell. Also symmetrically a second estimate $r_{1.5}$ is given by equation (10).

$$r_{1.5}=2*r_2-r_{.5} \tag{10}$$

In equation (10) the $r_{.5}$ is from the next half Hertz cell.

The method of quadratic curve fit interpolation to estimate the other RF amplitude in $$\frac{\pi}{2} A/D$$

is given by equation (11).

$$r_{.5}=-r_{1.5}/3+r_1+r_0/3 \tag{11}$$

The method quadratic interpolation to estimate $r_{1.5}$ is given by equation (12).

$$r_{1.5}=-r_{.5}/3+r_1+r_2/3 \tag{12}$$

Again second estimates can be obtained in the reverse direction. The second estimate for $r_{.5}$ is given by equation (13).

$$r_{.5}=-r_{1.5}/3+r_0+r_1/3 \tag{13}$$

In equation (13) the $r_{1.5}$ is from the previous half Hertz cell. Similarly, a second estimate for $r_{1.5}$ is given by equation (14).

$$r_{1.5}=-r_{.5}/3+r_2+r_1/3 \tag{14}$$

In equation (14) the $r_{.5}$ is from the next half Hertz cell.

The method of estimating the other RF amplitude in an A/D sample that contains both the carrier signal and other RF depends upon the likelihood that the superposition of the other RF is generally smooth and orderly between the integer $\pi$ A/D samples that are other RF only, rather than a less likely abrupt change of direction or strong discontinuity. When ambiguity persists it is best to use all of the curve fits of the method where consistency in the multiple estimates is far more likely than in a single deviation. It should also be noted that when the other RF is dominated by one strong other RF transmitter in a frequency near the carrier signal, the quadratic interpolation estimate can usually present a very close estimate of the other RF in a half Hertz cell A/D.

The DC balance checking prevents any carrier single detection error, but it does not prevent two errors in the same symbol. The five examples that are shown graphically in FIGS. 2-6 will employ the DC balance checks in slightly different ways. In each of the examples and in the graphics displayed in the accompanying figures, the first symbol immediately follows the data block header which is a $$3\frac{\pi}{2}$$

negative carrier signal amplitude which allows the other RF amplitude in that half Hertz cell to be known with certainty.

Figure 2:
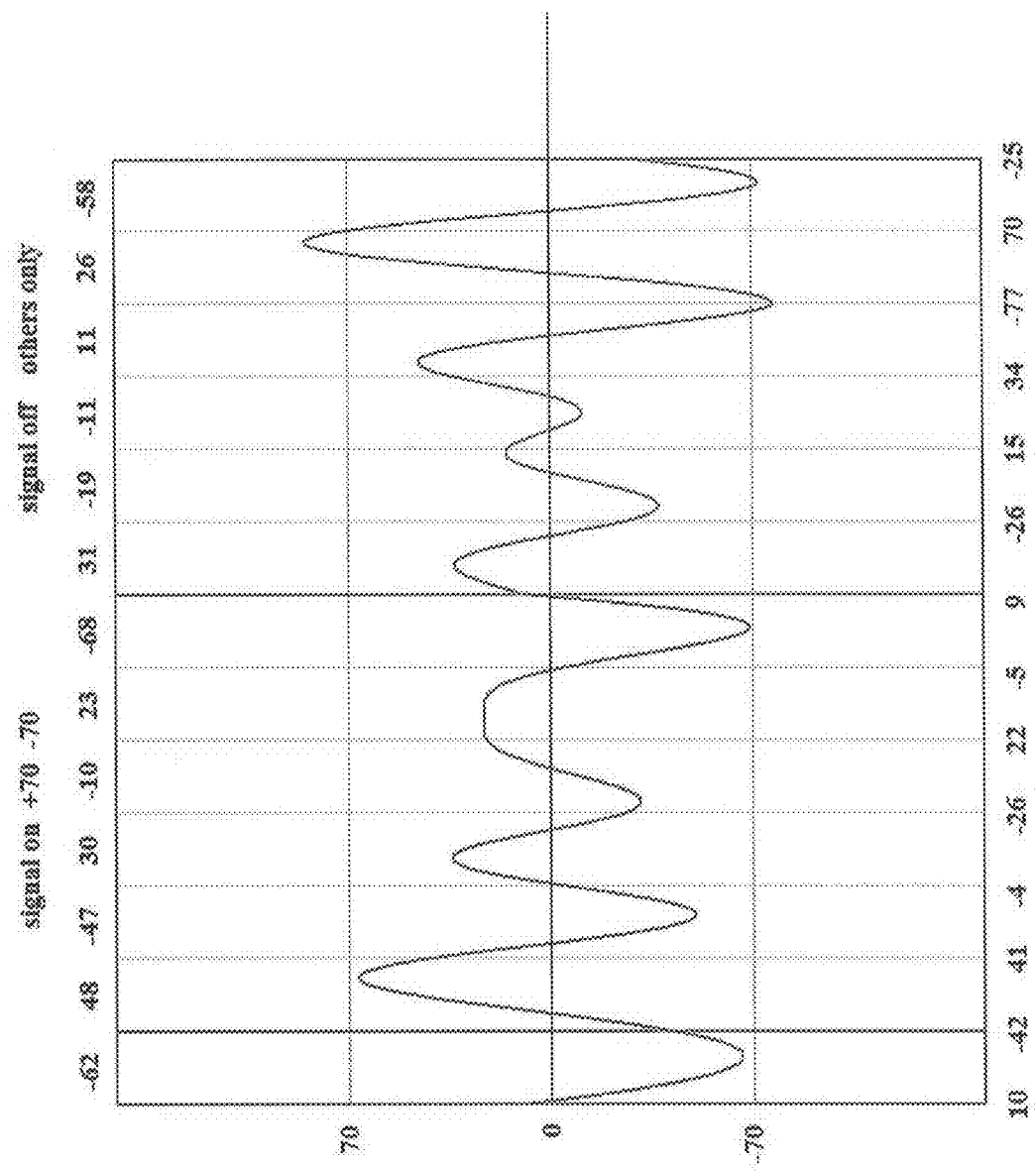
FIG. 2 graphically displays an exemplary on and off signal design example illustrating the tracking of the amplitude of the other RF in accordance with an embodiment.

Carrier Signal Design and Detection Examples:

The example of FIG. 2 displays two symbols of 3 Hertz duration with a data rate of f/3 bps. The first symbol has the transmitter oscillator 3 on at amplitude 70, and the second symbol has no transmitted carrier signal; it is only random other RF. To detect the signal on, all three $$\frac{\pi}{2} A/D$$

samples would have $s_{.5}=70$, and all three $$3\frac{\pi}{2} A/D$$

samples would contain $s_{1.5}=-70$.

The other RF $r_{1.5}=8$ in the last $$3\frac{\pi}{2} A/D$$

of the header because the header had known signal amplitude here of $s_{1.5}=-70$ and the A/D sample $a_{1.5}$ was $-62$, so per equation (2), $a_{1.5}=(-70+8)=-62$. If the transmitter was on, then signal $s_{0.5}=70$, and per equation (1) we have $a_{0.5}=48$ which would require per equation (1) $r_{.5}=-22$ as $48=70-22$.

The A/D sample $r_0=-42$ and A/D sample $r_1=4_1$ and $r_{1.5}=8$. Using theses sample amplitudes as inputs, the quadratic interpolation curve fit estimate of $r_{.5}$ using equation (13) is $-8/3-42+41/3=-33$; this compares well with $-22$ if the transmitter is on at $s_{.5}=70$, and $-33$ does not compare well to 48 if the transmitter is off. That is, it is far more likely that the transmitter is on based upon the equation (13) interpolation.

The carrier signal detection in all of the methods of the present invention are likelihood comparisons between the possible signal states. An additional indicator provided by the linear interpolation of equation (5) is $r_{.5}=(-42+41)/2=-0.5$ Again, $-0.5$ is closer to $-22$ than to 48.

The third $$3\frac{\pi}{2} A/D$$

in symbol 1 has $a_{1.5}=-68$ to compare to $s_{1.5}=-70$ if it is likely that the other RF has a zero crossing near $1.5\pi$. The estimate of a zero crossing by the equation (4) method formula is $1+(-5/-14)=1.357\pi$. The linear interpolation estimate of $r_{1.5}$ per equation (6) is $-5/2+9/2=2$, which per equation (2) matches the $-70+2=-68$ A/D exactly. While additional curve fit estimates could have been computed, it is sufficient to detect that the transmitter was on in symbol 1 based upon the two close comparisons by the curve fit methods just described.

The second symbol in FIG. 2 has three consecutive low amplitude half Hertz cell A/D samples of $a_{1.5}=-19$, $a_{.5}=-11$ and $a_{1.5}=11$; these amplitudes would have required the other RF to have consecutive amplitudes of $r_{1.5}=-51$, $r_{.5}=-81$ and $r_{1.5}=81$ per equations (1) and (2) if the transmitter was on. But the $1\pi$ and $2\pi$ A/D's in the second half Hertz cell of the symbol are $r_1=-26$ and $r_2=15$ indicating that a zero crossing exists in this cell per equation (4) at $1+(-261-41)=1.634\pi$. Since the other RF would have zero amplitude near this location, the $-19$ A/D value of the other RF is more likely than the $r_{1.5}=-51$ amplitude with the signal $s_{1.5}=-70$ on. The linear interpolation estimate for $r_{1.5}$ per equation (6) is $-26/2+15/2=-5.5$, which is close to $-19$ and thus supports further this likelihood that the transmitter was off in symbol 2.

There is also a zero crossing of the other RF in the fourth half Hertz cell that had $a_{1.5}=0+11=11$ with no signal compared to $a_{1.5}=-70+81=11$ if the transmitter had been on. The $r_{1.5}=81$ is not likely with a zero crossing in the half Hertz cell. These two consistent high likelihoods should be sufficient to detect that the transmitter was off for symbol 2.

Figure 3:
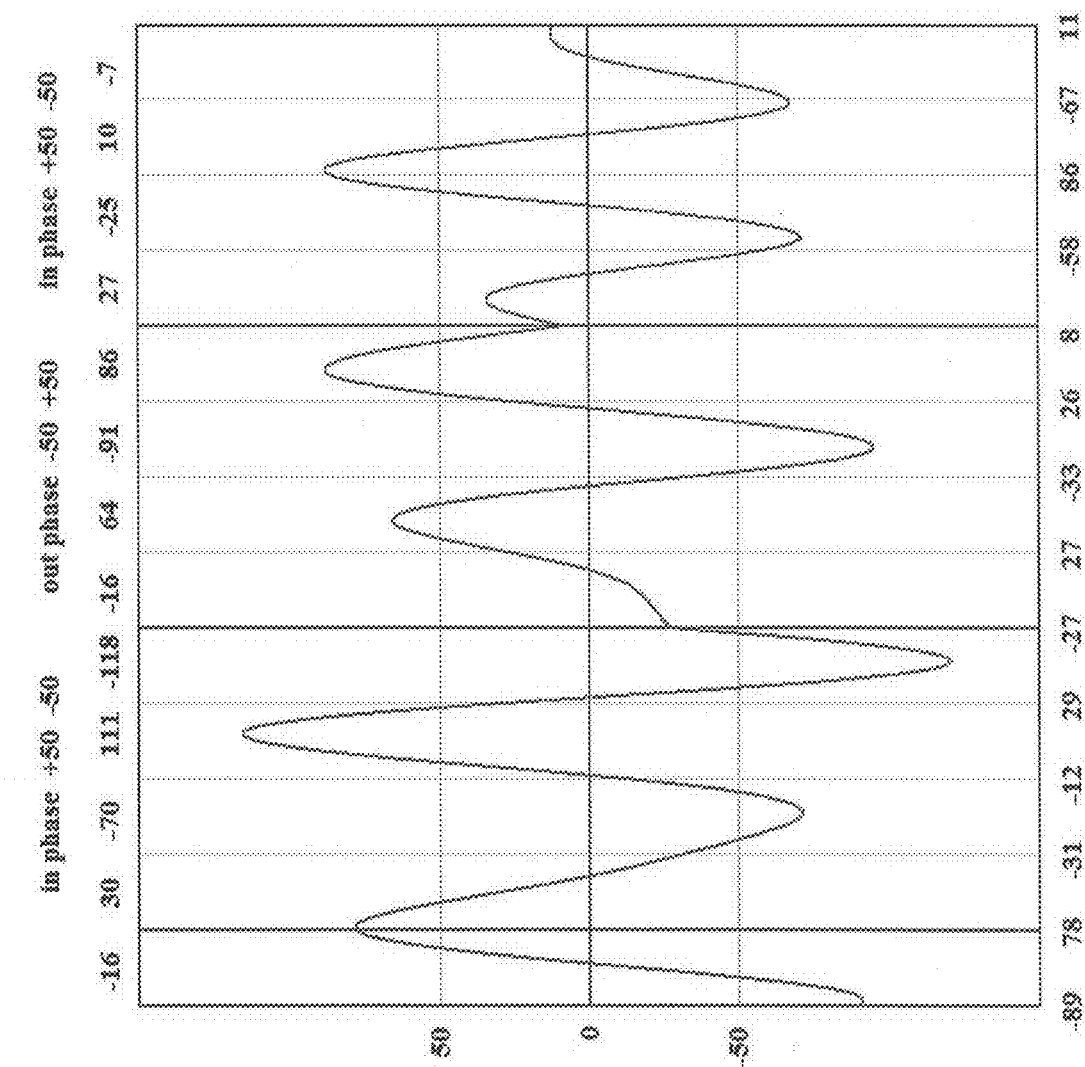
FIG. 3 graphically displays an exemplary phase signal design illustrating tracking of the amplitude of the other RF in accordance with an embodiment.

The example of FIG. 3 displays three symbols of two Hertz cycles where the transmitter signal has amplitudes of $s_{.5}=50$ and $s_{1.5}=-50$ when in phase and $s_{.5}=-50$ and $s_{1.5}=50$ when the transmitter is 180 degrees out of phase. The data rate in the FIG. 3 example is $f/2$ bps. A fast simple detection of an in phase transmitter in this example is made by observing that each $a_{.5}$ $$\frac{\pi}{2} A/D$$

sample is positive and each $a_{1.5}$ $$3\frac{\pi}{2} A/D$$

sample is negative in both symbols 1 and 3. The opposite signs of $a_{.5}=-16$ and $a_{.5}=-91$ in the $$\frac{\pi}{2} A/D$$

samples and $a_{1.5}=64$ and $a_{1.5}=86$ in the 3pi/2 A/D samples strongly indicate an out of phase transmitter in symbol 2 of FIG. 3.

Symbol 3 has half Hertz cell A/D's of $a_{.5}=27$, $a_{1.5}=-25$, $a_{.5}=10$ and $a_{1.5}=-7$. The integer A/D's in symbol 3 are $r_0=8$, $r_1=-58$, $r_2=86$, $r_1=-67$ and $r_2=11$. These are A/D samples are alternating in sign, which implies that the other RF must have a zero crossing within each of these 4 half Hertz cells. This is consistent with the half Hetiz cell A/D's that would contain plus and minus 50 signal amplitudes all being lower than the carrier signal at plus or minus 50 and not higher, due to the other RF all having a zero crossing in these cells. Specifically, equation (7) gives another RF amplitude estimate of $r_{.5}=(8-58)/2=-25$ and this $-25$ plus an assumed in phase signal of 50 equals 25 per equation (1) to compare with the actual A/D sample of $a_{.5}=27$. Further, equation (8) provides an estimate of the other RF amplitude in the second half Hertz cell of symbol 3. Here, $r_1=-58$ and $r_2=86$ and $r_{1.5}=(-58+86)/2=14$ combined with the assumed in phase signal amplitude of $-50$ per equation (2) is $-36$ to compare with the actual A/D sample of $a_{1.5}=-25$.

The example embodied in FIG. 4 discloses a very unique set of four DC balanced symbols with constant zero crossings. These symbols in 2 Hertz by signal design are all transmitted in phase with at low amplitude of 30 in the first half Hertz cell at $$\frac{\pi}{2}$$

or at the higher amplitude of 80 with the opposite level required in the second $$\frac{\pi}{2}$$

half Hertz cell. Thus, the symbol has a different level in each of the two $$\frac{\pi}{2} A/D\text{'s}$$

and in each of the two $$3\frac{\pi}{2} A/D\text{'s;}$$

that is a 30 and an 80, and a $-30$ and a $-80$. The data rate is f bps. In this carrier signal design, the DC balance enables a fast detection method, herein termed the "low high" method. This low high method detects the highest of the two $$\frac{\pi}{2} A/D$$

sample amplitudes as 80, and the lower as 30. This low high method also detects the least negative of the two $$3\frac{\pi}{2} A/D$$

amplitudes as −30 and the more negative A/D amplitude as −80. Three of the four symbols of this very unique signal design are presented in FIG. 4. The fourth valid symbol of this special design is 80, −30, 30, −80; it is not presented in FIG. 4. The detected levels are printed in the top line of FIG. 4.

Since the last half Hertz cell of the data block header has $a_{1.5}=-56$ A/D amplitude where $s_{1.5}=-80$ signal as a known amplitude and $r_{1.5}=24$ for the other RF amplitude, per equation (2) $-56=-80+24$. The first half Hertz cell of symbol one has the $$\frac{\pi}{2} A/D$$

at $a_{.5}=39$ setting the other RF amplitude at $r_{.5}=9$ if the carrier signal is $s_{.5}=30$ per equation (1), and other RF amplitude of $r_{.5}=-41$ if the carrier signal was $r_{.5}=80$. A quadratic interpolation estimate per equation (13) is $r_{.5}=-24/3+44-90/3=-38+44=6$ to compare with $r_{.5}=9$ for the carrier signal being $s_{.5}=30$ in this cell. The curve fit methods of the invention offer a verification for the fast low high detection method and would be required when the two $$\frac{\pi}{2}$$

or two $$3\frac{\pi}{2} A/D$$

sample amplitudes have nearly the same amplitude due to random other RF.

The example of FIG. 5 displays two symbols in three Hertz cycles coded with three amplitude levels at 30, 80 and 130; this carrier signal design has more than 64 unique DC balanced symbols with constant zero crossings. This signal design codes 6 bits per symbol. The data rate is 2f bps. The other RF amplitudes in the FIG. 5 example are sufficiently low allowing for detection of a code level from the A/D samples themselves. The fourth half Hertz cell in the second symbol is the most ambiguous with $$3\frac{\pi}{2}$$

amplitude or $a_{1.5}=-100$ which is near the −105 mid value between levels −80 and −130. The other RF amplitude would be $r_{1.5}=-20$ if the code level is $s_{1.5}=-80$ or would be $r_{1.5}=30$ if the carrier signal code level is $s_{1.5}=-130$. Since $r_{.5}=8$ per equation (1) where $a_{.5}=138$ and $s_{.5}=130$, a quadratic interpolation estimate per equation (13) is $-8/3-16+28/3=-9.33$; this compares well with $r_{1.5}=-20$, but not well with $r_{1.5}=30$. The detected levels are printed in the top line of FIG. 5.

The example of FIG. 6 displays two symbols in three Hertz cycles coded with three amplitude levels at 30, 80 and 130, as in the FIG. 5 example. But here, the third half Hertz cell is always coded at $s_{.5}=30$ by design. This reduces by half the number of unique symbols from 64 to 32 with a data rate of 5/3f bps, but this carrier signal design is able to tolerate larger other RF amplitudes. The detected levels are printed in the top line of FIG. 6.

In the second symbol of FIG. 6 half Hertz cell 3 is a known $s_{.5}=30$ and the A/D's in cells 4, 5 and 6 are all close to coding levels of this carrier signal design. These four cells are in DC balance at 30, −130, 130 and −30. This requires that cells 1 and 2 must be the plus and minus of the same signal level in order to preserve the required DC balance. The choices here are $s_{.5}=30$ and $s_{1.5}=-30$, or $s_{.5}=80$ and $s_{1.5}=-80$ only because $a_{.5}=51$ and $a_{1.5}=-63$ are between 30 and 80, and well below 130. If $s_{.5}=30$ and $s_{1.5}=-30$, then the other RF amplitudes are $r_{.5}=21$ and $r_{1.5}=-33$, per equations (1) and (2). If $s_{.5}=80$ and $s_{1.5}=-80$, then the other RF amplitudes would be $r_{.5}=-29$ and $r_{1.5}=17$, per equations (1) and (2). A linear extrapolation curve fit estimate for the other RF amplitude $r_{1.5}$ in half Hertz cell 2 from the known $r_{.5}$ in cell 3 of $a_{.5}=1$ together with $r_2=6$ is $2*6-1=11$ per equation (8); this compares well with $r_{1.5}=17$ if the coding level was $s_{1.5}=-80$, but not well with $r_{1.5}=-33$ if the coding level was $s_{1.5}=30$.

In the first symbol of the example of FIG. 6, the $$3\frac{\pi}{2} A/D$$

in half Hertz cell 2 has amplitude $a_{1.5}=-100$; this is ambiguously close to −105, the mid value between −80 and −130. Assuming that the code value was $s_{1.5}=-80$, the other RF amplitude would be $r_{1.5}=-20$ per equation (2). The quadratic interpolation curve fit estimate from half Hertz cell 3 where $r_{.5}=26$ due to $s_{.5}=30$ by design, and $r_1=15$ and $r_2=-29$ gives $r_{1.5}=-26/3-29+15/3=-32.67$ per equation (14) to compare with $r_{1.5}=-20$ when $s_{1.5}=-80$. This negative estimate would not compare as well to the other RF amplitude of $r_{1.5}=30$ if the code level was instead $s_{1.5}=-130$.

Error Prevention:

It is the intent of the invention disclosed herein to use the three computational methods selectively and in combination, along with the integer π A/D samples of the other RF amplitudes, to effectively tolerate the interference in the receiving antenna 1 from the random other RF in order to achieve correct detections of the transmitted carrier signal in a very few Hertz cycles. While a number of computations were shown in the examples of FIGS. 2-6 to obtain useful curve fit estimates of the amplitudes of the other RF, addition checks would be computed when any detection remains ambiguous. The full range of extra checks includes the ten defined curve fits presented in equations (5) through (14); these ten are the linear and quadratic interpolations and the linear extrapolations from both time directions. They are computed for consistency voting, along with assuring DC balance within each symbol. Extra computational checks to resolve ambiguity may often require a longer pause before reverse signaling the transmitter to send the next data block, but such a pause would usually be faster than reverse signaling to request a data block retransmission. The link is also software adaptive in that the signal design can be changed based upon the present level of interference from the others.

What is claimed is:

1. A method of continuously monitoring wireless data transmissions, comprising:
   a. generating a clock signal;
   b. receiving a radio frequency (RF) carrier signal having a waveform with an antenna operatively connected to a receiver, the carrier signal having an amplitude s, a frequency f which defines continuous hertz (Hz) cycles, and being generated by a communications channel or link transmitter, the carrier signal being modulated and adapted to transmit information and/or data in the form of a data stream or data block continuously in hertz cycles of frequency f, and other RF energy transmissions generated by other transmitters and emitters (other RF), the other RF energy transmissions having an amplitude r;
   c. amplifying the carrier signal and the other RF;
   d. sampling the antenna waveform at $\frac{\pi}{2}$ in a hertz cycle containing the sum of the carrier signal and the other RF as defined by an equation $a_{0.5}=s_{0.5}+r_{0.5}$ and sampling the antenna waveform at 3 $\frac{\pi}{2}$ in a hertz cycle containing the sum of the carrier signal and the other RF as defined by an equation $a_{1.5}=s_{1.5}+r_{1.5}$;
   e. estimating a zero crossing time $z_{01}$ between $0\pi$ and $1\pi$ of the other RF defined by an equation $z_{01}=r_0/(r_0-r_1)$;
   f. estimating a zero crossing time $z_{12}$ between $1\pi$ and $2\pi$ of the other RF as defined by an equation $z_{12}=1+r_1/(r_1-r_2)$;
   g. estimating the amplitude and sign of the other RF in a $\frac{\pi}{2}$ A/D sample in a hertz cycle using a linear curve fit interpolation given by an equation $r_{0.5}=(r_0+r_1)/2$;
   h. estimating the amplitude and sign of the other RF in a 3 $\frac{\pi}{2}$ A/D sample in a hertz cycle using a linear curve fit interpolation as defined by an equation $r_{1.5}=(r_1+r_2)/2$;
   i. estimating the amplitude and sign of the other RF in a 3 $\frac{\pi}{2}$ A/D sample in a hertz cycle using a linear curve fit extrapolation defined by an equation $r_{1.5}=2r_1-r_{0.5}$;
   j. estimating the amplitude and sign of the other RF in a $\frac{\pi}{2}$ A/D sample in a hertz cycle using a linear curve fit extrapolation, the other RF amplitude and sign being defined by an equation $r_{0.5}=2r_1-r_{1.5}$;
   k. estimating the amplitude and sign of the other RF in a $\frac{\pi}{2}$ A/D sample in a hertz cycle using a linear curve fit extrapolation given by an equation $r_{0.5}=2r_0-r_{1.5}$, wherein $r_{1.5}$ is from an immediate prior time hertz cycle;
   l. estimating the amplitude and sign of the other RF in a 3 $\frac{\pi}{2}$ A/D sample in a hertz cycle using a linear curve fit extrapolation given by an equation $r_{1.5}=2r_2-r_{0.5}$, wherein $r_{0.5}$ is from an immediate next time hertz cycle;
   m. estimating the amplitude and sign of the other RF in a $\frac{\pi}{2}$ A/D sample in a second direction in a present time hertz cycle using a quadratic curve fit interpolation, the other RF amplitude and sign being defined by an equation $r_{0.5}=-r_{1.5}/3-r_1+r_0/3$;
   n. estimating the amplitude and sign of the other RF in a 3 $\frac{\pi}{2}$ A/D sample in a hertz cycle using a quadratic curve fit interpolation, the other RF amplitude and sign being defined by an equation $r_{1.5}=-r_{0.5}/3+r_1+r_2/3$;
   o. estimating the amplitude and sign of the other RF in a $\frac{\pi}{2}$ A/D sample in a hertz cycle using a quadratic curve fit interpolation, the other RF amplitude and sign being defined by an equation $r_{0.5}=-r_{1.5}/3+r_0+r_1/3$, where $r_{1.5}$ is from the immediate prior time hertz cycle;
   p. estimating the amplitude and sign of the other RF in a 3 $\frac{\pi}{2}$ A/D sample in a hertz cycle using a quadratic curve fit interpolation, the other RF amplitude and sign being defined by an equation $r_{1.5}=-r_{0.5}/3+r_2+r_1/3$ where $r_{0.5}$ is from the immediate next hertz cycle;

q. separating the other RF from the carrier signal to enhance detection of the carrier signal;

r. synchronizing the receiver and the link transmitter; and s. outputting the data to a user.

2. The method of claim 1 wherein the synchronization step further includes:

a. transmitting a pure sine wave from the link transmitter at the carrier signal frequency for a preselected number of Hertz cycles;

b. pausing the sine wave transmission for a predetermined interval;

c. retransmitting the sine wave for the same number of Hertz cycles transmitted in step a;

d. pausing the sine wave transmission for a second predetermined interval;

e. shifting the phase of the sine wave relative to the link transmitter in predetermined time step increments while continuing the A/D sampling of the carrier signals;

f. repeating the transmit/pause cycle and time incrementing steps set forth in steps a-e until synchronization is achieved;

g. reverse signaling the link transmitter that synchronization has been achieved in response to simultaneous detection of approximately the positive and negative full signal amplitudes of the carrier signal by the at least four A/D converters during continuous sampling thereof at integer and half integer pi (n) intervals; and h. assigning one of the plurality of A/D converters to the carrier wave samples as the transmission start time.

3. The method of claim 2 further including the steps of sending a header block from the link transmitter and thereafter commencing transmission of the data stream.

4. The method of claim 1 wherein the carrier signal has constant zero crossing points.

5. The method of claim 4 wherein the carrier signal is DC balanced.

6. The method of claim 1 wherein the carrier signal is DC balanced.

7. The method of claim 1 further including the steps of testing for DC balance in a known DC-balanced carrier signal to resolve detection ambiguity; and either reverse signaling the link transmitter to signal successful detection, or reverse signaling the link transmitter to retransmit a data block.

8. The method of claim 1 to estimate the other RF at 0.5 π and at 1.5 π wherein a carrier signal design modulation has one of two positive low high signal modulation amplitudes in a first $$\frac{\pi}{2}$$

A/D sample and the other of two positive low high signal modulation amplitudes in a second $$\frac{\pi}{2}$$

A/D sample and wherein a carrier signal design modulation has one of two negative low high signal modulation amplitudes in a first $$3\frac{\pi}{2} A/D$$

sample and the other of two negative low high signal modulation amplitudes in a second $$3\frac{\pi}{2} A/D$$

sample.

9. A receiver for detecting radio frequency transmissions, the transmissions including a transmitted modulated carrier signal generated by a communications channel or link transmitter and carrying information and/or data in the form of a data stream or block and further including other RF energy transmissions generated by other transmitters and emitters superimposed upon the transmitted carrier signal, the receiver comprising:

an antenna adapted to receive the carrier signal and the other RF;

an oscillator operable to generate a clock signal;

at least four analog to digital (A/D) converters adapted to sample the transmitted signal and the other RF at $$\frac{\pi}{2}$$

intervals in response to the clock signal;

a processing module operatively connected to the at least four A/D converters, the oscillator and the antenna, the processing module including processors for detecting and analyzing the carrier signal and other RF, a memory, a link control module and a processor for mapping the data stream to an output signal; and a user output interface for communicating the data stream to a user.

10. The receiver of claim 9 wherein the carrier signal has constant zero crossings.

11. The receiver of claim 10 wherein the carrier signal is DC balanced.

12. The receiver of claim 9 wherein the carrier signal is DC balanced.

13. The receiver of claim 9 wherein the processing module further includes a link control antenna for reverse signaling information from the receiver to the link transmitter, and a link control module for detecting synchronization of the link transmitter and the receiver and reverse signaling synchronization status to the link transmitter via the link control antenna.

14. The receiver of claim 13 wherein the processing module is structured and arranged to send a pause request to the link transmitter.

15. The receiver of claim 13 wherein the processing module is structured and arranged to send a data block retransmit request to the link transmitter.

16. The receiver of claim 15 further including a processing unit for communication with the memory, the processing unit being structured and arranged to process the carrier signal and the other RF to separate the other RF from the carrier signal before the data stream is mapped to an output signal.

17. The receiver of claim 16 wherein the processing unit is adapted to signal the link control to transmit a different modulated carrier signal in response to the amplitude of the other RF detected by the receiver.

* * * * *